United States Patent Office 3,334,388
Patented Aug. 8, 1967

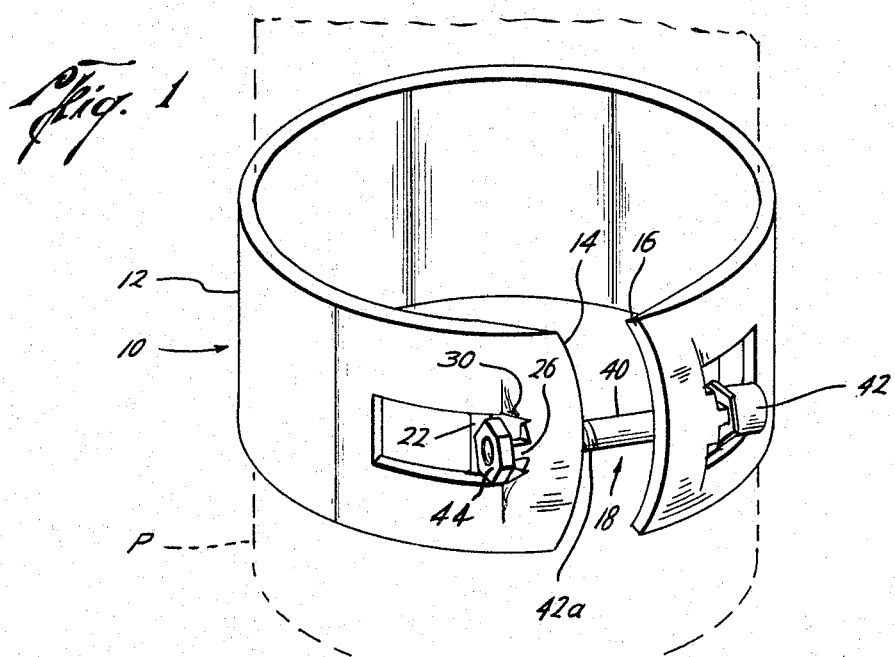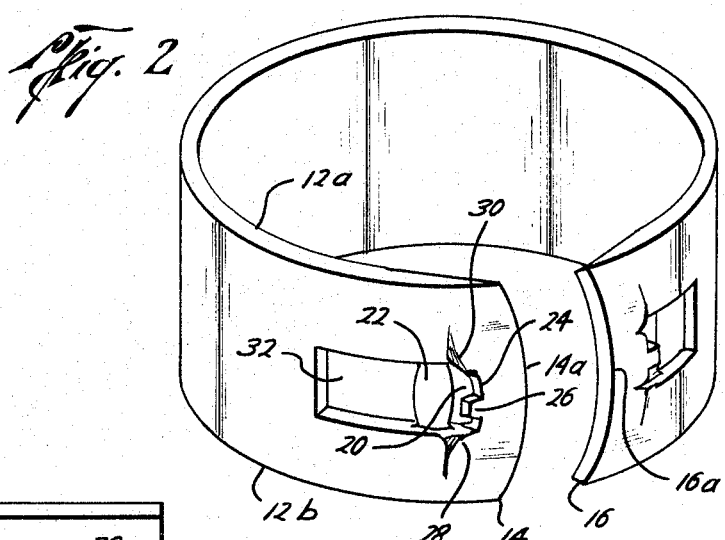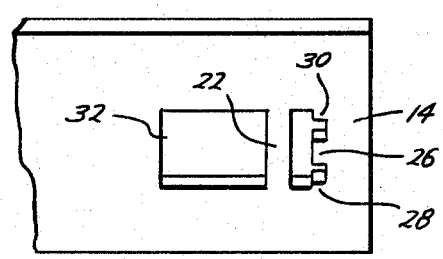

3,334,388
FRICTION CLAMP
Charles W. Turbyfill, P.O. Box 490,
Marshall, Tex. 75670
Filed Mar. 28, 1966, Ser. No. 537,806
1 Claim. (Cl. 24—279)

ABSTRACT OF THE DISCLOSURE

A friction clamp for pipe having a split ring shaped body which is constructed to improve control of stress concentrations near the spaced, facing ends of the split ring and in the loading of the friction clamp when placed about a pipe.

---

An object of this invention is to provide a new and improved friction clamp for attachment to pipe and the like wherein the shoulders of the bolt and nut or other fastening means are received on bearing surfaces to distribute the load thereof within the structure of the friction clamp to thereby avoid stress concentrations in the body of the clamp.

An additional object of the present invention is to provide a new and improved friction clamp including a pair of spaced, facing end portions having a shape not including compound curvatures but, rather, formed along a relatively large radius of curvature to eliminate work hardening and which also avoids stress concentrations such as those found at the work hardened portions of friction clamps known in the prior art.

An important object of the present invention is to provide a new and improved friction clamp having a pair of bolt holes near the ends thereof spaced from one another such that the fastening assembly passes beneath the ends of the arcuate metal band without requiring extensive reshaping of the ends and the consequential work hardening which makes the portions of material at the changes in curvature somewhat brittle and unable to bear the stresses associated with full loading.

Yet another object of the present invention is to provide a new and improved friction clamp for pipe including an arcuate metal band having a pair of openings in each end which are constructed and arranged to provide even stress distribution across the metal band when the band is placed in tension on being snugly fitted about a pipe or other cylindrical object.

Other objects and advantages of the present invention will become more readily apparent after a consideration of the included drawings wherein:

FIG. 1 is a pictorial view of the present invention placed about a cylindrical member indicated in dotted lines to illustrate the relationship thereto;

FIG. 2 is a similar pictorial view illustrating the friction clamp and showing further details of the stress bearing means provided by the present invention; and FIG. 3 is a view of one end of the metal body of the present invention formed as a planar member to further illustrate the means receiving a fastener therein in the utilization of the present invention.

Considering the invention broadly, attention is first directed to the structure illustrated in FIG. 1 which includes the present invention denoted by the numeral 10 positioned about the pipe P which is shown in dotted line. The present invention includes an encircling arcuate metal body 12 and a pair of spaced, facing ends 14 and 16 which are urged towards one another by fastening means 18. It will be appreciated that the proper use of the friction clamp 10 shown in FIG. 1 contemplates use of the fastening means 18 to place tension in the metal body 12 of the band extending about the pipe P. Such tension is distributed as stress spanning fully across the body 12 at the mid-portions extending to the end portions 14 and 16 of the friction clamp. The present invention is particularly constructed and arranged to distribute the stress near the ends 14 and 16 to permit full loading thereof and to further avoid the possibility of snapping or otherwise breaking the friction clamp. Moreover, as will be described in greater detail hereinafter, work hardened areas in the friction clamp are eliminated to provide a structure which is essentially yieldable to stresses.

Considering the invention more in detail, the metal body 12 is formed of some appropriate diameter to fit about the pipe P with a relatively small clearance therebetween for ease of installation. The metal body 12 preferably has a predetermined width and thickness sufficient to provide a substantial friction clamp ring about the pipe P and is preferably formed out of a workable metal. The metal band is formed into the symmetrical, facing ends 14 and 16 by conventional metal forming techniques wherein the ends 14 and 16 are constructed and arranged to provide stress distribution through the body of the member as noted hereinabove.

Since the ends 14 and 16 are similar with the exception of being mirror images of one another, a description of the end 14 is sufficient for the end 16 which has the same structure and arrangement. In FIG. 2, the ends 14 and 16 are shown as being gently curved arcuate portions having a relatively large radius of curvature at the extremity of the friction clamp. The arcuate portions 14 and 16 extend somewhat along the body of the friction clamp to an area approximately indicated at 14a where the curvature of the end portions is gently faded into the planar portions of the body 12 proper. Of course, it will be appreciated that, along the edges 12a and 12b of the body, the deviations from a perfect circle are minimum since the gently curved end portions 14 and 16 have maximum radial displacement at the central portions thereof.

The area of maximum projection of the end portions, which is denoted in the drawings at 14a and 16a, is located, in each case, immediately forwardly of opening means 20 for receiving the fastening means 18 therethrough. The opening means 20 is generally defined by the transversely extending metal support member 22 and one edge 24 of the gently curved arcuate portion 14. The edge 24 is interrupted by a rearwardly extending bearing member 26 which projects away from the arcuate portion and which extends parallel to and above the metal member 22. Additionally, a pair of fillet members 28 and 30 smoothly joins the gently curved arcuate portion 14 with the body of the metal band 12 and provides surfaces angularly directed with respect to the opening 20 whereby a bearing edge is provided on each side of the opening for contact against the fastening means 18 as will be described in greater detail hereinafter. In further particular, the fillet members 28 and 30 are preferably integrally formed with the body and extend smoothly and flowingly from the curved portion 14 to the planar portion of the friction clamp 12.

The member 22 which spans across the lower portions of the opening 20 defines an additional longitudinal opening 32 which extends along the arcuate body 12 for some distance. The opening 32 defines an access space which, for purposes of convenience, permits ease of engagement of the fastening means 18 previously noted. The longitudinal opening 32 is preferably centered in the encircling member 12 and is preferably somewhat narrow so as to leave sufficient metal across the width of the friction clamp to properly enable the clamp to bear a full load in operation.

Attention is directed to FIG. 3 which illustrates in greater detail the structure previously noted. FIG. 3 is a view of the end of the friction clamp shown in planar configuration to aid in the description of the present invention. In FIG. 3, the arcuate portion 14 is planar fully across the end thereof to more particularly illustrate the load bearing member 26 and the fillets 28 and 30 for distributing the stress in the friction clamp. The transversely extending member 22 is shown prior to its final formation as comprising a relatively narrow member adjacent the narrow opening 32, and it is located on the center line of the friction clamp. On forming the end portion shown in FIG. 3 to the final configuration, the point 14a at the edge of the clamp indicates the approximate beginning of the curvature of the arcuate portion 14 which is approximately in line with the fillets 28 and 30. The fillets 28 and 30 flow smoothly on formation to provide the angularly extending bearing edges which co-operate with the centered bearing surface 26 for disposing of the forces acting in the friction clamp 10 of the present invention.

Returning again to FIG. 1, it illustrates the fastening means 18 as incorporating a bolt member 40 which is externally threaded and which includes a cylindrical head 42. The head 42 is adapted to receive an Allen wrench within an opening (not shown) as means for torquing the fastening means to its desired tightness. The shank of the bolt member 40 includes the threaded portion partially shown at 42a which extends fully to the opposite end and which is adapted to be engaged with an internally threaded nut 44. The nut 44 is placed on the shaft of the bolt 40 and engages threads 42a, and in response to the rotation of the head 42, the fastening member draws the friction clamp of the present invention tightly about the pipe P.

It should be noted in FIG. 1 that the nut 44 includes a surface generally perpendicular with respect to the longitudinal axis of the fastening means 18 to provide a load on the centered bearing surface 26 and the pair of symmetrical fillets which provide the bearing edges adjacent the opening 20. Thus, it will be appreciated that the reaction stresses caused in the friction clamp by fastening means 18 are distributed across the width of the metal body 12 to avoid stress concentrations. Moreover, the transversely extending member 22 which is shown at the nether side of the nut 44 is preferably contoured to provide a seat for the nut 44 which cooperates with one face thereof, it being assumed that the nut 44 is of conventional configuration.

In addition to the stress distributing means co-operating with the nut 44 shown at the left-hand side of FIG. 1, the cylindrical head 42 at the opposite end of the fastening means 18 also includes a generally perpendicular shoulder adapted to be positioned against the centered bearing member 26 and the co-operating fillet members 28 and 30. Likewise, the cylindrical head 42 can be rested on the transversely extending member 22 at its nether side.

In operation, the present invention is installed by placing same on the pipe P without the fastening member 18, or, alternatively, with the fastening member 18 relaxed to permit the metal body 12 to expand and fit about the pipe P. If the pipe P includes enlargements at either end, the friction clamp 10 of the present invention is expanded in a manner known by those skilled in the art to place same on the pipe P. At any event, once the apparatus is positioned at the desired location relative to the pipe P, the fastening means 18 is operated to pull the member up snugly against the pipe P. This usually entails operation of an Allen wrench and a conventional wrench to tighten the nut 44 on the bolt 40 which extends essentially tangentially to the body 12. When the proper tightness of the friction clamp is achieved, the internal surface bears firmly against the wall of the pipe P and frictionally engages same to such an extent that an excessive axial force along the pipe P is required to displace same.

Of particular interest to the present invention is the operation of the fastening member relative to the ends 14 and 16 wherein the stresses acting in the friction clamp are evenly distributed. In the first instance, it was previously noted that the ends 14 and 16 are formed as gently curving end portions which have a relatively large radius of curvature. This assists in the distribution of the stress acting across the end somewhat irregularly due to the presence of the openings 32 in the ends. Moreover, the gentle curvature which flows downwardly at the fillets 28 and 30 to the plane of the body 12 avoids areas typically work hardened during fabrication so that the means of the present invention is fully yieldable in the vicinity of the engagement of the fastening means with the metal body. All portions are equally yieldable so that the load acting on the opening 20 is permitted to act across the width of the metal body 12 and is not concentrated at sharp bends, corners, or the like. Moreover, the edges of the fillets 28 and 30 co-operating with the centered bearing member 26 and the transversely extending member 22 distribute stress resulting from operation of the fastening member 18 across the width of the metal body 12 and the result is a fully usable friction clamp.

The device of this invention is particularly distinguished over devices known in the prior art which are customarily an essentially planar (in a cylindrical plane) member having centrally located U-shaped portions which receive a fastening member therethrough. The U-shaped portion concentrates stress at the corners of the U which makes the structure very susceptible to failure. Moreover, the act of forming an inverted U in the center area of a metal strip work hardens the metal at the corners since the corners are formed with a relatively small radius of curvature and further because such corners usually include compound curvatures. Because of this, friction clamps known in the prior art have been known to fail due to the shear forces resulting from placing the clamps on the pipe.

It should be noted that the shear stress in devices using an inverted U fastener member concentrate shear stress at the corners of the U and adjacent the body wherein the stress acts parallel to the plane of the device which facilitates the failure of the device. In the present invention, the shear stress is not parallel to the plane of the device, but it is angularly distributed by the fillets 28 and 30 and the center bearing member 26.

Broadly, the present invention relates to new and useful improvements in friction clamps, and more particularly, to friction clamps including means for disposing of stresses within the structure of the metal body to provide a member fully yieldable to the stresses therein to be able to operate at full loads.

What is claimed is:

A friction clamp adapted to be placed about pipe or the like, comprising:

(a) an arcuately extending metal band having a pair of spaced, facing ends and adapted to be positioned about a pipe;

(b) a gently curved portion at each end of said band extending across the width thereof with the center raised above the plane of said metal band, said portion being smoothly continuous with said band and having a relatively large radius of curvature;

(c) openings means adjacent the center of said gently curved portions and aligned with one another;

(d) a centered bearing surface on said gently curved portions extending into said opening means;

(e) fastening means including abutting shoulder means carried at opposite ends thereof facing one another for engaging the ends of said metal band at said opening means wherein said fastening means extends essentially tangentially to said metal band;

(f) a pair of symmetrical fillets between said gently curved portion and said metal band which extends angularly with respect to said bearing surface and present bearing surfaces co-operating with said centered bearing surface for receiving said fastening means thereagainst;
(g) said centered bearing surface and said symmetrical fillets evenly bearing the load placed on said metal band by said fastening means;
(h) additional longitudinally extending opening means centered of said metal band and said opening means in line with said fastening means for permitting access thereto;
(i) a metal member extending across said longitudinal opening means and contoured to co-operate with said fastening means and also defining one end of said longitudinal opening means; and
(j) said fastening means causing shear stress in said gently curved portion extending at an angle thereto wherein the body of said metal band is placed in tension snugly about the pipe and stress concentrations are avoided in the spaced, facing ends thereof.

References Cited

UNITED STATES PATENTS

| | | | |
|---|---|---|---|
| 1,785,314 | 12/1930 | Kelly | 24—284 |
| 2,458,007 | 1/1949 | Knapp | 24—279 |
| 2,983,982 | 5/1961 | Solum et al. | 24—279 |
| 3,154,829 | 11/1964 | Pahel et al. | 24—279 |

JAMES L. JONES, JR., *Primary Examiner.*